Aug. 25, 1953   E. O. EMANUEL AF GEIJERSTAM   2,649,789
METHOD AND APPARATUS FOR DISCONTINUOUS DRYING
USING A HEATING AND A COOLING CYCLE
Filed Jan. 23, 1951                                    2 Sheets-Sheet 2
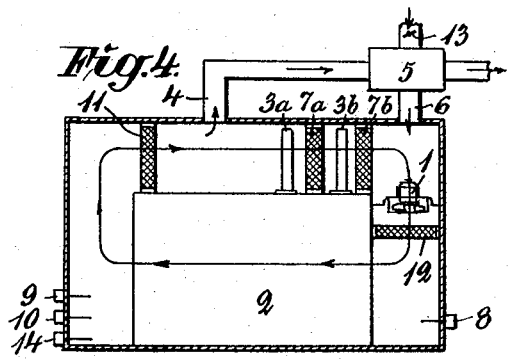
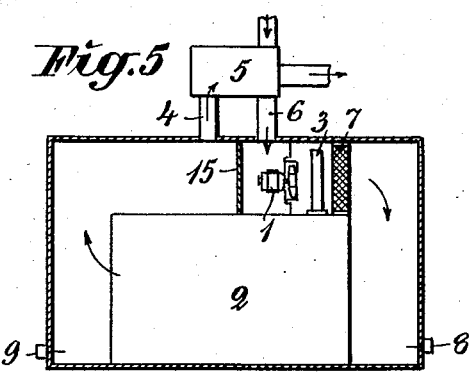
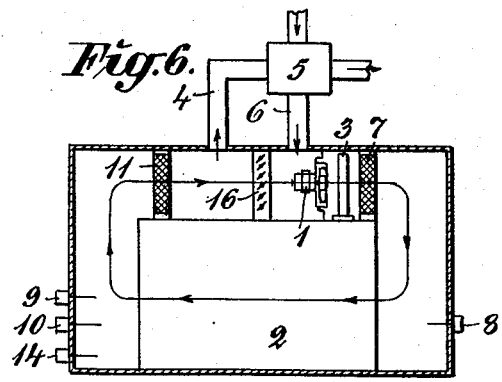
INVENTOR:
ERIK OLOF EMANUEL AF GEIJERSTAM
By Richardson, David and Nordon
Attys

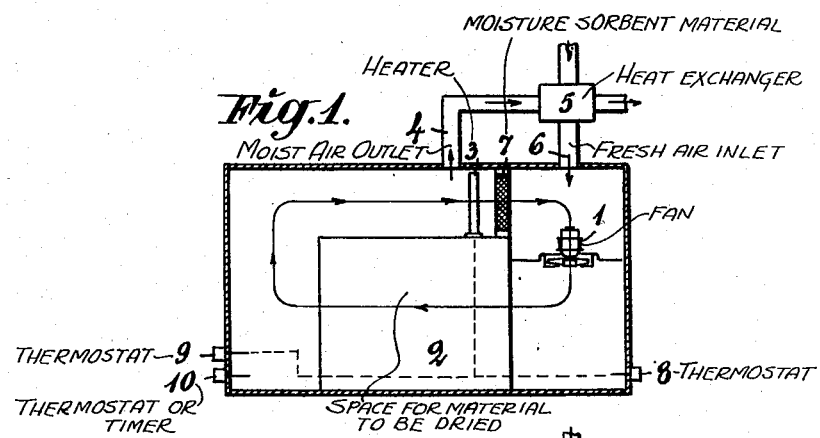
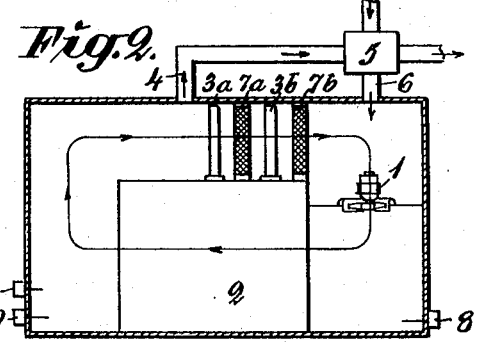
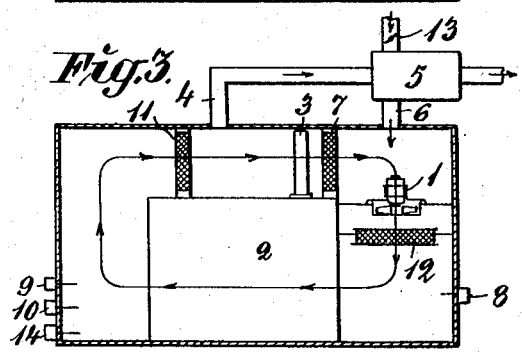

Patented Aug. 25, 1953

2,649,789

UNITED STATES PATENT OFFICE 2,649,789

METHOD AND APPARATUS FOR DISCONTINUOUS DRYING USING A HEATING AND A COOLING CYCLE

Erik Olof Emanuel af Geijerstam, Stockholm, Sweden, assignor to Aktiebolaget Enköpings Verkstader, Enkoping, Sweden, a corporation of Sweden Application January 23, 1951, Serial No. 207,307
In Sweden November 3, 1949

8 Claims. (Cl. 34—13)

Good heat economy can be obtained in large drying plants with the help of a continuously operated dryer, that is such a dryer through which the material to be dried is continuously fed. In these dryers the driest and warmest air is blown against the driest material, whilst the damp air is withdrawn from the dryer at the zone containing the coldest and dampest material, a zone in which the material is preheated and a zone in which the material is cooled, being preferably provided in the dryer, the heat removed from the material in the cooling zone being used to heat the material in the preheating zone, so that the heat content of the dried material is utilized to a certain extent for drying the material to be dried. Moreover a heat exchanger for heat exchange between the damp air withdrawn and the dry air fed in is provided and the dry air fed in and the air circulating in the dryer are mixed with each other. Such a continuously operated dryer has the disadvantage that it requires constant attention and complicated conveying means for feeding the material to be dried through the dryer. In small or medium size dryers the attention and the conveying means become too costly in proportion to the amount of heat saved.

In discontinuously, or cyclically operated dryers the material to be dried remains stationary during the heating and drying in the dryer, whereby no attention and only simple conveying means are necessary. In order to obtain the best possible heat economy the drying is effected as a rule at the highest temperature which can be withstood without deterioration of the material to be dried, and which temperature can be controlled and maintained by means of a thermostat. At the start, that is when the material to be dried is very damp, a rapid evaporation is obtained, the moist air withdrawn contains much moisture and the heat economy is good. When the material becomes drier, however, especially when its outer surfaces are dried out, the evaporation of water takes place more slowly, the water content of the air decreases and the heat economy becomes poor. Where a particularly thorough drying is desired, the last remaining water requires a disproportionately large amount of heat (to be removed) for its removal. Moreover there are many substances, for example, certain foodstuffs, which withstand a higher temperature so long as they contain much water, but which require lower drying temperatures, as the substance becomes drier. The drying process is very complicated in these cases and often costly vacuum drying must be used.

Besides, in drying with warm air at a constant or increasing temperature an uneven drying is obtained. The substance becomes dryer on the outer surface and remains more moist in the inner parts thereof. This is due to the fact that the temperature in the inner parts of the substance is lower and the vapour pressure in these parts is higher than at the outer surface, since a temperature gradient is necessary for the transfer of heat to the inner parts of the substance and also a vapour pressure difference is necessary for the transfer of vapour.

These disadvantages in the prior known discontinuously operated dryers can be overcome according to the method of the present invention in that an airflow which is led in a previously known manner through the material to be dried located in a drying chamber and which comprises either only fresh air or a mixture of fresh air and air circulating through the material to be dried in the chamber, is led, before or after passage through the material to be dried, through one or more heating batteries and moisture sorbent material which may be either adsorptive or absorptive in its action. Reference to sorbent material includes both adsorptive and absorptive material. Reference to adsorption also includes absorption. The sorbent material is disposed behind, or downstream with respect to the heating batteries and upstream with respect to the material to be dried so that the moisture sorbent material is dried out by the air which has been heated in the heating batteries and the material to be dried is partially dried, whereafter the heating batteries are turned off and the moisture of the drying air is removed by means of the sorbent material and the drying of the material to be dried is completed at a falling temperature, so that the material to be dried is simultaneously cooled. It is thus possible to obtain lower operating costs for the drying equipment, lower cost of supervision, a good heat economy, and frequently an improved quality of drying as compared with conventional discontinuous or cyclically operated drying apparatus.

One arrangement for carrying out the method according to the invention comprises a drying chamber for the material to be dried, one or more heating batteries located in the drying chamber and containers filled with moisture-adsorbent material located behind each heating battery and adapted to be passed by the drying air, as well as means for turning off the heating battery.

These and other features of the invention will appear from the description of six embodiments of the dryer diagrammatically illustrated in Figures 1 to 6 of the drawings.

In the dryer according to Fig. 1 the drying air is passed by a fan 1 through a space containing the material 2 to be dried and a heating battery 3. The damp air withdrawn through a duct 4 passes through a heat-exchanger 5, in which the fresh air fed in through a duct 6 is pre-heated. This is an ordinary drying system, in which the drying air consists of a mixture of fresh air and circulating air, in order to lower the maximum temperature and also the heat-transmission losses.

According to the invention a container 7 with sorbent material is located between the heating battery 3 and the place where the fresh air and circulating air are mixed. This sorbent material becomes strongly heated and dried out during the time that the heating battery 3 is operating. When cooling is to begin the heating battery 3 is turned off, so that the sorbent material becomes cooled and receives water from the circulating air and yields heat to the circulating air. The vapour pressure of the moisture in the circulating air decreases to an extent corresponding to the decrease of temperature. The drying of the material 2 to be dried can thus be carried on although the temperature decreases. The evaporation from the material becomes very intense since air, the moisture of which has a decreasing vapour pressure and the temperature of which is decreasing, is blown against the material 2 which is heated to a higher temperature than that of the air. The cooling can be carried on as long as the air withdrawn contains more water vapour than the air fed in. In this way the material 2 can be dried to a low water content, without having to use too high a temperature, and the greater part of the heat content can be used for further drying. A part of the water which evaporates during the cooling period is removed by the drying air and another part is taken up by the sorbent material and this water must be evaporated anew during the subsequent drying period.

In order to obtain the desired result, the drying should be controlled. This is effected with the help of a thermostat 8 or 9 provided before or behind the material 2, which thermostat controls the supply of heat. The cooling period can be determined by means of a timing device or by the thermostat 10.

It is possible according to the invention to obtain a thorough drying of the material to be dried, even though the highest temperature during the drying is maintained relatively low. This can be effected by using two or more heating batteries 3a, 3b and a corresponding number of containers 7a, 7b of sorbent material as shown in Fig. 2. At the start of drying the heating battery 3a operates and drying of the sorbent material in the containers 7a and 7b as well as the material 2 is started. When the drying has proceeded so long that a suitable temperature is obtained the heating battery 3a is turned off and in its place the heating battery 3b is operated. The circulating air is dried and heated by the sorbent material in the container 7a, after which it is further heated by the heating battery 3b. In this way the sorbent material in container 7a is very thoroughly dried out. After a short time this sorbent material is cooled and the sorbent material in container 7b is dried out. The circulating air is thoroughly dried and heated and the material to be dried is dried very rapidly. When cooling then is to begin, the heating battery 3b is turned off. The circulation air is firstly dried and heated by the sorbent material in container 7a and secondly by the sorbent material in container 7b. Air containing moisture of a very low vapour pressure now passes through the material to be dried, whereby a rapid cooling and drying is obtained.

When drying the sorbent material, the dryer the sorbent material becomes, the greater is the amount of heat required per kg. of water evaporated. As mentioned above an improved heat economy is obtained according to the invention in that the last part of the drying is carried out wholly or partly by transferring the water from the material to be dried to the sorbent material.

In order to obtain the best possible heat economy, the air withdrawn should contain the greatest possible amount of water vapour at the existing temperature. This can be done by disposing a container 11 with sorbent material behind the material 2 to be dried and before the place where the damp air is withdrawn, as shown in Fig. 3, as well as a container 12 with sorbent material behind the place where the fresh air is mixed with the circulating air. In the first part of the heating period, the sorbent material in container 11 takes up water which has been evaporated from the sorbent material in container 7 and the material 2 to be dried. During this time the duct 6 is closed by means of a valve 13 so that the fresh air cannot pass into the dryer. In the last part of the heating period and during the cooling period the valve 13 is opened, whereby the water taken up by the sorbent material in container 11 evaporates. The moment for opening the valve 13 can be determined by means of a thermostat 14. The air withdrawn then contains a higher water content than that which corresponds to the dampness of the material to be dried. In the last part of the cooling period the damp air withdrawn becomes more and more cold and thus the fresh air passing through the heat-exchanger 5 becomes colder and colder, while the water content remains constant. The drying capacity of the fresh air is thus lowered, in contrast to the circulating air. This is compensated for by the sorbent material 12, which takes up water when the air temperature decreases, without the water content decreasing to a corresponding extent.

The arrangement shown in Fig. 4 only differs from the arrangement shown in Fig. 3 in that in a similar way to the arrangement according to Fig. 2 two or more heating batteries 3a, 3b, and a corresponding number of containers 7a, 7b with sorbent material are employed, instead of only one heating battery 3 and a single container 7 with sorbent material.

In the arrangment according to Fig. 5 a partition 15 is located between the place where the damp air is withdrawn and the place where the fresh air enters the drier, so that the drying air does not comprise a mixture of fresh air and circulating air, but only fresh air. Apart from this the arrangement according to Fig. 5 operates by the same principles as the arrangement according to Fig. 1.

In the arrangement according to Fig. 6 a valve 16 is provided instead of the valve 13 according to Figs. 3 and 4, which is open, unlike the valve 13 in the first part of the heating period, and is closed during the end of the heating period and during the cooling period.

In the following two examples, figures are given which show the amount of heat required in two drying processes in accordance with this invention.

*Example 1*

Drying of wood from an air-dry state (25% humidity) to a state suitable for carpentry (12% humidity) with an arrangement according to Fig. 3 or 4.

The wood is pre-heated and dried to a mean humidity of about 15% at 40° C. The further drying to 12% is obtained during cooling to 20° C.

The following heat quantities are released per kg. of dried wood in the cooling period.

1 kg. dried wood: $0.3 \times 1 \times 20 = 6$ kcal./kg.
0.16 kg. water: $1 \times 0.15 \times 20 = 3$ kcal./kg.

Total: 9 kcal./kg.

25% increase for the other heat capacities: $0.25 \times 9 = 2.25$ kcal./kg.

Total: 11.25 kcal./kg.

During the cooling about 800 kcal./kg. water evaporated are necessary on average:

During the cooling $11.25 \div 800 = 0.0141$ kg. water/kg. wood=1.41% is removed with the aid of 11.25 kcal./kg.

Of the water removed, altogther $25-12=13\%$, $(1.41 \div 13) 100 = 11\%$ is obtained during the cooling.

A further decrease in the heat required is obtained on account of the transfer of water between the wood and the adsorption material. The heat required can altogether be decreased by about 15%. The amount of sorbent material should be about 15% of the amount of dried wood.

In a dryer according to Fig. 3 or 4 a heating period is automatically obtained in which the fresh air valve 13 is shut and water evaporates from the sorbent material. This water is condensed on the cold wood whereby heating without drying is obtained. The wood can begin to dry first when the fresh air valve 13 is opened and this occurs as soon as the required temperature is reached. Compared to a drying without sorbent material, with the same rate of drying of the wood, the damp air withdrawn can contain a greater amount of water because of the release of water from the sorbent material.

During drying at constant temperature, a more thorough drying is always obtained at the surface than in the interior of the material. This is due partly to the temperature in the interior of the material being lower, corresponding to the temperature difference which is necessary for the transfer of heat, and partly to the vapour pressure in the material being higher, corresponding to the pressure difference necessary to expel the water vapour. The drier the material becomes, the more the temperature difference increases, due to the heat transfer capacity becoming poorer and the material becoming more porous, and thus more impervious to the water vapour. When the last part of the drying is carried out with cooling by means of sorbent material, a great part of the heat of evaporation is recovered by the heat content of the material itself. The temperature difference is thus substantially decreased and the drying becomes more uniform. At the end of the cooling period a very slow drying is obtained due to the low temperature, whereby the drying becomes more uniform.

*Example 2*

Drying of silica gel with an arrangement according to Fig. 5 or 6.

At the start of the cooling period the mean temperature of the silica gel is 75° C. and its water content is 13%, based on the dry material. During the cooling period the temperature decreases to about 35° C. The temperature decrease is thus 40° C. The following amounts of heat are released per kg. of dried silica gel with a specific heat of 0.22 in the cooling period:

1 kg. silica gel: $0.22 \times 1 \times 40 = 8.8$ kcal.
0.13 kg. water: $1 \times 0.13 \times 40 = 5.2$ kcal.

Total: 14.0 kcal.

28% increase for the other heat capacities: $0.28 \times 14 = 4.0$ kcal.

Total: 18.0 kcal.

The increase of 28% corresponds to the other heat capacities as for example the tanks, the walls, the fan and the valves of the whole system which must be cooled if the silica gel shall be used for adsorption. It does not include, however, such heat capacities which shall not be cooled, e. g. the heating battery and the adsorption material.

During the cooling the heat required is about 750 kcal. per kg. of water evaporated. With 18 kcal.

$$18 \div 750 = 0.024 \text{ kg. water}$$

are evaporated, which corresponds to 2.4% water per kg. of dried silica gel.

By removing moisture from air with to 50% relative humidity, the water taken up can be about 10% of water, based on the dry weight of silica gel. This means that 24% of the amount of the water evaporated is removed during the cooling period. In addition thereto the transfer of water which is obtained between the silica gel and the adsorption material, causes a slight further decrease in the heat required. The amount of heat which is used for heating the silica gel to the maximum temperature, is not influenced, however, by the arrangement according to the invention. It has been shown in practical experiment that the heat required can be decreased to 20 to 27% according to the arrangements and working condition. In this case the total amount of adsorption material is 20 to 35% of the amount of silica gel.

Having now particularly described the nature of my invention and the manner of its operation what I claim is:

1. The method of drying a material containing moisture which comprises the steps of: circulating a stream of air and causing it to come in contact with said material to be dried; initially heating said stream of air and causing it to pass through a moisture sorbent material and dry the same prior to its coming in contact with said material to be dried; and subsequently discontinuing said heating and allowing said circulating air to become cooler, whereby moisture is removed from said circulating air by said sorbent material, and drying of the material to be dried is completed at falling temperatures while simultaneously cooling the material.

2. The method of drying according to claim 1, comprising the further steps of introducing fresh air into said circulating stream and removing moist air from said stream.

3. The method of drying according to claim 2, comprising the further step of exchanging heat between said fresh air and said air removed from said circulating stream.

4. A device for drying material comprising a chamber for material to be dried; means defining a closed path for the circulation of a stream of air in said chamber through said material; moist air outlet means in communication with said chamber; heating means; sorptive means comprising moisture sorbent material; fresh air inlet means in communication with said chamber; and means defining a space for the material to be dried, all of said means being serially disposed along said path in the order above named; means for circulating air through said path, and means for controlling operation of said heating means whereby said drying device is operated first during a heating interval and said drying is completed during a cooling interval.

5. A device according to claim 4, further comprising heat exchanging means connected between said moist air outlet means and said fresh air inlet means.

6. A device according to claim 4, further comprising: a first additional sorptive means disposed in said path intermediate said first-named sorptive means and said space defining means; and a second additional sorptive means disposed in said path intermediate said space defining means and said outlet means.

7. A device according to claim 4, wherein said means for controlling operation of said heating means comprises thermostat means disposed in said stream of air.

8. A device according to claim 4, further comprising additional sorptive means disposed in said path intermediate said first-named sorptive means and said air outlet means; and additional heating means disposed in said path intermediate said additional sorptive means and said air outlet means.

ERIK OLOF EMANUEL AF GEIJERSTAM.

References Cited in the file of this patent

UNITED STATES PATENTS

| Number | Name | Date |
|---|---|---|
| 215,191 | Wilson et al. | May 6, 1879 |
| 1,353,358 | Steenfeldt-Lindholm | Sept. 21, 1920 |
| 1,415,010 | Benjamin | May 9, 1922 |
| 1,580,274 | Anderson | Apr. 13, 1926 |
| 1,631,052 | Oertel | May 31, 1927 |
| 1,694,807 | Brown | Dec. 11, 1928 |
| 2,249,624 | Bichowsky | July 15, 1941 |
| 2,421,121 | Haagen-Smit | May 27, 1947 |
| 2,480,146 | Lee | Aug. 30, 1949 |

FOREIGN PATENTS

| Number | Country | Date |
|---|---|---|
| 110,711 | Sweden | of 1944 |